United States Patent [19]

Schweigert et al.

[11] Patent Number: 4,969,936
[45] Date of Patent: Nov. 13, 1990

[54] FILTRATION APPARATUS

[75] Inventors: Dennis L. Schweigert, Bullhead, Ariz.; Mohammed A. Bayati, Roland Heights; Gerald J. Endler, II, Los Angeles, both of Calif.

[73] Assignee: Westates Carbon, Los Angeles, Calif.

[21] Appl. No.: 457,204

[22] Filed: Dec. 26, 1989

[51] Int. Cl.⁵ .................................................. B01D 53/04
[52] U.S. Cl. ........................................ 55/179; 55/316; 55/387
[58] Field of Search ...................... 55/74, 75, 179, 316, 55/387, 389

[56] References Cited

U.S. PATENT DOCUMENTS

| | | | |
|---|---|---|---|
| 3,086,342 | 4/1963 | Goettl | 55/233 |
| 3,795,090 | 3/1974 | Bannebey | 55/387 |
| 3,824,770 | 7/1974 | Eckstein | 55/242 |
| 3,925,046 | 12/1975 | Hickey et al. | 55/387 |
| 3,935,803 | 2/1976 | Bush | 98/36 |
| 3,961,920 | 6/1976 | Gilbert | 55/387 |
| 4,344,778 | 8/1982 | Matsuoka et al. | 55/279 |
| 4,350,504 | 9/1982 | Biachuk | 55/274 |

OTHER PUBLICATIONS

Package Sorption Device System Study, No. PB-221 138, by NTIS, Apr. 1973.

Primary Examiner—Charles Hart
Attorney, Agent, or Firm—F. Eugene Logan

[57] ABSTRACT

A gas filtration apparatus for filtering large volumes of air. The apparatus has a plenum chamber which features a V-shaped housing having a main portion located inside the plenum chamber, and an upper portion extending outside and above the top plenum chamber. The V-shaped housing has two vertical legs extending from a vertically oriented apex end which forms an acute angle between the vertical legs, and a vertically oriented prong end opposite the apex end. The apex end is near the outlet of the plenum chamber and the prong end is near the inlet of the plenum chamber. Each vertical leg has an inward vertical wall and an outward vertical wall. The distance between the walls defining a first length. A second length is defined by the distance that the upper portion of the V-shaped housing extends above the top surface of the plenum chamber. The second length is at least as great as the first length. The apparatus has a plurality of small apertures in the inward and outward vertical walls in the main portion of the V-shaped housing for gas flow; a sealing device for sealing the V-shaped housing in the plenum chamber; a cover for opening and closing the upper portion of the V-shaped housing; and a cover for opening and closing the lower portion of the V-shaped housing.

26 Claims, 20 Drawing Sheets

FILTRATION APPARATUS

BACKGROUND OF THE INVENTION

Filter equipment for removing particulate and undesirable gaseous components from gas streams have been in existence for many years. Odors, organic gases and particulate removal are frequently the primary concern when the gas stream to be cleaned is an air stream and especially when the air is intended to be vented to the environment.

An example of such equipment for use over a hospital bed for a recuperating patient is disclosed in U.S. Pat. No. 3,935,803. In this invention hospital room air is filtered in a canopy-like apparatus and the filter air is showered down over the hospital bed. In the apparatus air is prefiltered and passed through replaceable activated charcoal filters.

A larger filter for use in a commercial food cooking operation disclosed in U.S. Pat. No. 4,350,504. This patent discloses several designs with charcoal bed elements arranged in a series of permanently installed V-shaped configurations. The charcoal is reactivated in place with a built-in heater and damper assembly. Since the filter system is designed mainly for a hood over a stove in a restaurant, the reactivation cycle can take place after normal restaurant business hours without interruption to food preparation operations.

A multistage pollution control system with an inverted conical shaped lower bed-first stage and an upright conical shaped upper bed-second stage is disclosed in NTIS report, PB-221 138 entitled Package Sorption Device System Study. A pelletized carbon is added to the upper bed and spent pellets removed through a valve in the lower bed.

A housing containing a combination evaporative cooler and carbon filter is disclosed in U.S. Pat. No. 3,086,342 which has a pair of carbon filters pivotally mounted in the housing. Other filtering systems which may contain shaped filters are disclosed in U.S. Pat. No. 3,824,770 for removing bacteria from air, and U.S. Pat. No. 4,344,778 for adsorbing moisture from air.

The principal disadvantages of these and many other similar prior art filter systems are that they are either poorly suited for use in filtering large volumes of gases, or, if they are useful for filtering large volumes of air, either the space such systems require or the ease of replacement of spent filter media particles is difficult and time consuming.

Replaceable cartridges or filter elements containing a adsorbent particle media usually require a relatively long period of time for replacing and resealing in filtration systems. The principal advantage of replaceable cartridges resides in the ability to reactivated them by heating or other means.

Systems which reactivate the spent adsorbent particle media without removal from the system during a separate regeneration cycle, require the system to be inoperative during the regeneration cycle.

What is needed therefore is a filtering system which can handle a large volume of gas, including a gas such as air, when such gases have objectionable gaseous contaminates by adsorbing such gaseous contaminates with a adsorbent. What is also needed is a system in which spent adsorbent particles can be quickly removed and replaced with fresh adsorbent media. Therefore what is needed is a large filtration system wherein the adsorbent particles can be quickly discharged and recharged without substantial loss of on-stream time. The arrangement of the containment housing for the adsorbent particles should be such that the adsorbent particles will not form bridges during charging of the adsorbent into its housing and also such that uniform filter bed densities can be quickly achieved and duplicated from one adsorbent charging to the next. There is also needed a system in which spent particle filter or adsorbent media can be quickly removed without appreciable time spent in breaking up bridged material and scraping of the walls of the container or housing to dislodge and remove filter particles or adsorbent.

SUMMARY OF THE INVENTION

Particulate materials of all types, including filter particle media, activated carbon and other adsorbent particles, will when poured on to a horizontal surface form a cone-like pile. The angle that the pile of particles forms with the horizontal is known as the angle of repose or angle of rest. The angle of repose varies from one particulate substance to the next depending on the nature of the particular matter such as surface roughness, tackiness, electrostatic charge and density. Substance such as activated carbon particles have a relatively high angle of repose which means that such particles tend to form bridges in process apparatus thereby making achievement of uniform bed densities difficult.

In this invention a V-shaped housing having vertical walls assures that uniform and reproducible bed densities can be easily produced and that drainage of spent particle beds can be completed quickly thereby improving process predictability and lessening downtime of the filtering apparatus during replacement of spent particle filter media. This is important in large volume capacity filters since drainage of spent adsorbent particles and replacement with fresh activated adsorbent particles can be very time consuming, difficult, dirty, and in the case of a carbon adsorbent particles, dangerous because of static change induced explosions. Furthermore uniform bed densities which are reproducible are important to insure maximum efficiency and predictability in the filtration operation so that replacement of spent adsorbent can be programmed into the operation of the overall process thereby minimizing downtime and cost associated therewith.

Accordingly filtration systems in which adsorbent particles are reactivated while remaining in the apparatus, for example as by a heat-reactivation cycle, while convenient because there is essentially no handling of the adsorbent, are time consuming and require either a standby duplicate filtration system in order to keep the principal process operation on stream, or a shutdown of the principal process operation while adsorbent regeneration is occurring. Neither of these choices is desirable for commercial processes involving large gas volumes.

Alternately physically removing filter modules or packs containing spent adsorbent particles and replacing them with new filter modules or packs, does not reduce the downtime for large systems because of difficulties such as insuring that seals involved with each installed module or pack are properly installed and sealed on each replacement module.

Therefore, it is an object of this invention to provide a gas filtering apparatus which is useful for filtering large volumes of gas which does not require large space for installation. It is also an object to provide a bed of adsorbent particles through which the gas to be filtered must flow. It is a further object that the adsorbent particles can be quickly charged to the apparatus and that uniform adsorbent particle beds densities can be quickly formed without bridging of the adsorbent particles in the bed when the bed is formed. It is still a further object of this invention that spent adsorbent particles can be quickly discharged or drained from the apparatus and that particle bridging, which prevents rapid discharging of adsorbent particles from the apparatus does not occur. It is also an object of this invention to provide a bed of filter particles which will not be short circuited by settling of the filter particles. Therefore in the design of this invention the containment walls of the apparatus of this invention are vertical so that rapid charging of fresh adsorbent particles and rapid discharging of spent adsorbent particles can be quickly performed. The V-shaped arrangement of adsorbent housing in which the legs of the housing form an acute angle minimizes the overall width of the filtration apparatus. Furthermore the V-shaped filtration elements of this invention can be easily paralleled connected one to another to provide systems which can handle any desired flow of gas for filtration. The containment walls are also extended above the normal filtration area of the bed to insure that settling of the bed's filter particles will not permit short circuiting of the gas over the top of the bed.

DESCRIPTION OF THE PREFERRED EMBODIMENTS

Figure 1:
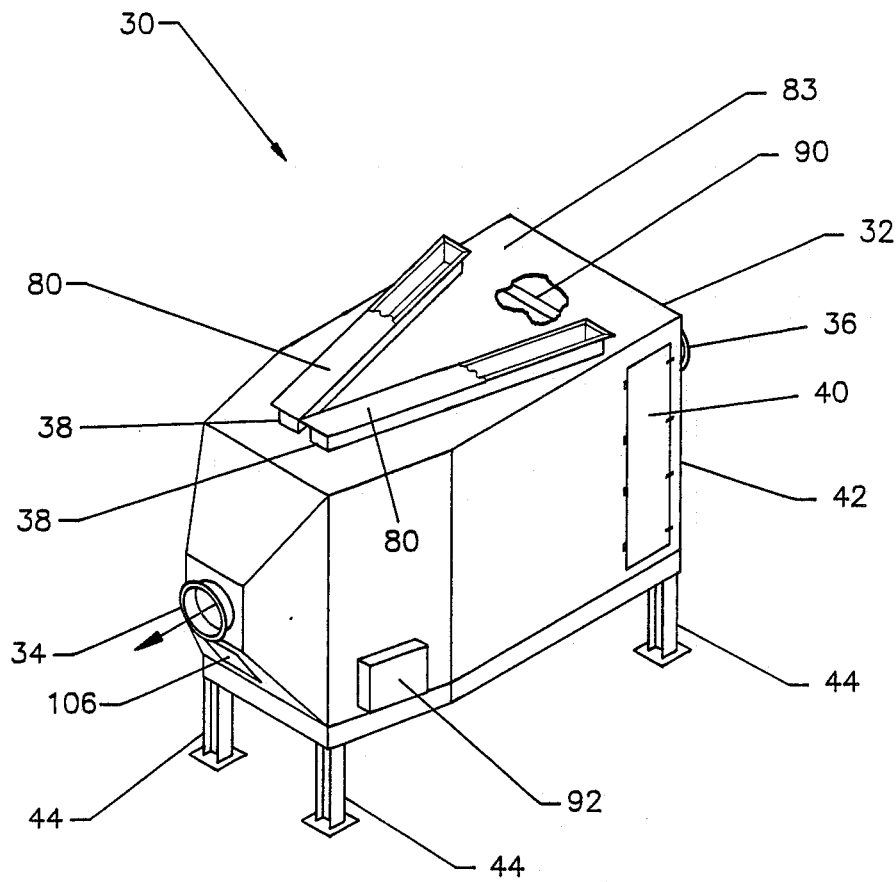
FIG. 1 is a perspective view of a filtration apparatus of this invention showing the top, right side and outlet or front side thereof.
Figure 6:
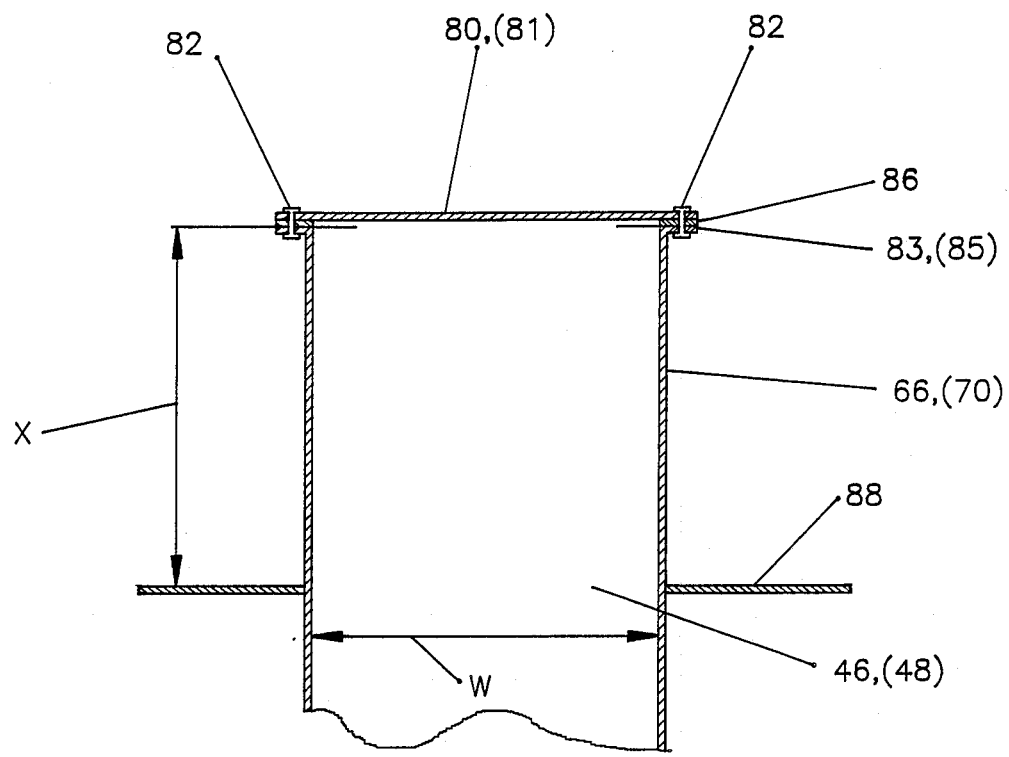
FIG. 6 is a detail view of the V-shaped housing of FIG. 1 and the cover therefor.

One embodiment of air filtration apparatus of this invention, generally designated by 30, is shown in FIGS. 1 and 6. Filtration apparatus 30 comprises a plenum chamber 32, having outlet 34, inlet 36, V-shaped housing 38, door 40, doorway 42, removable cover 106 and legs 44.

Figure 4:
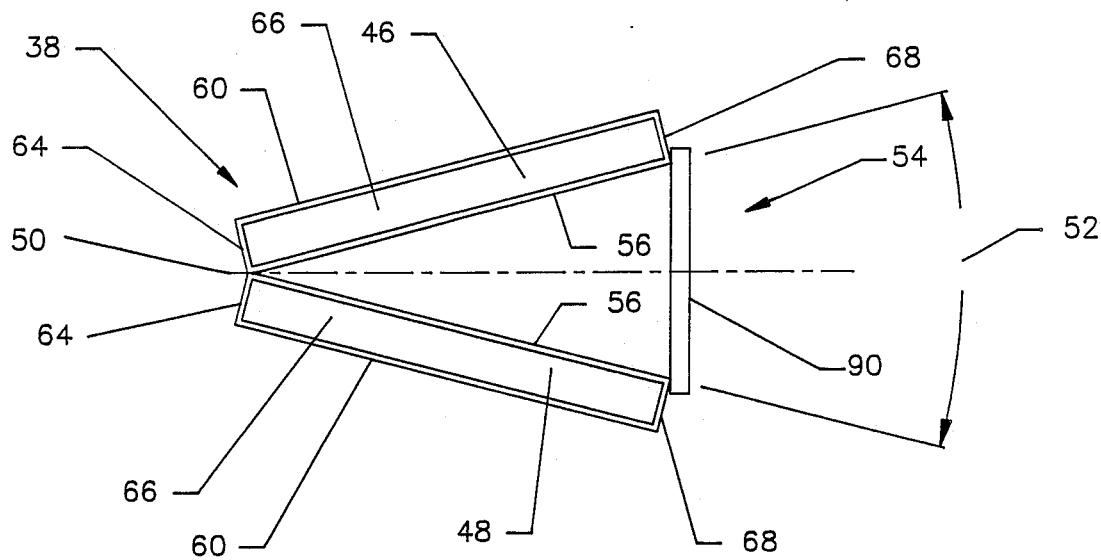
FIG. 4 is a top plan view of the V-shaped housing and prefilter of FIG. 3.
Figure 5:
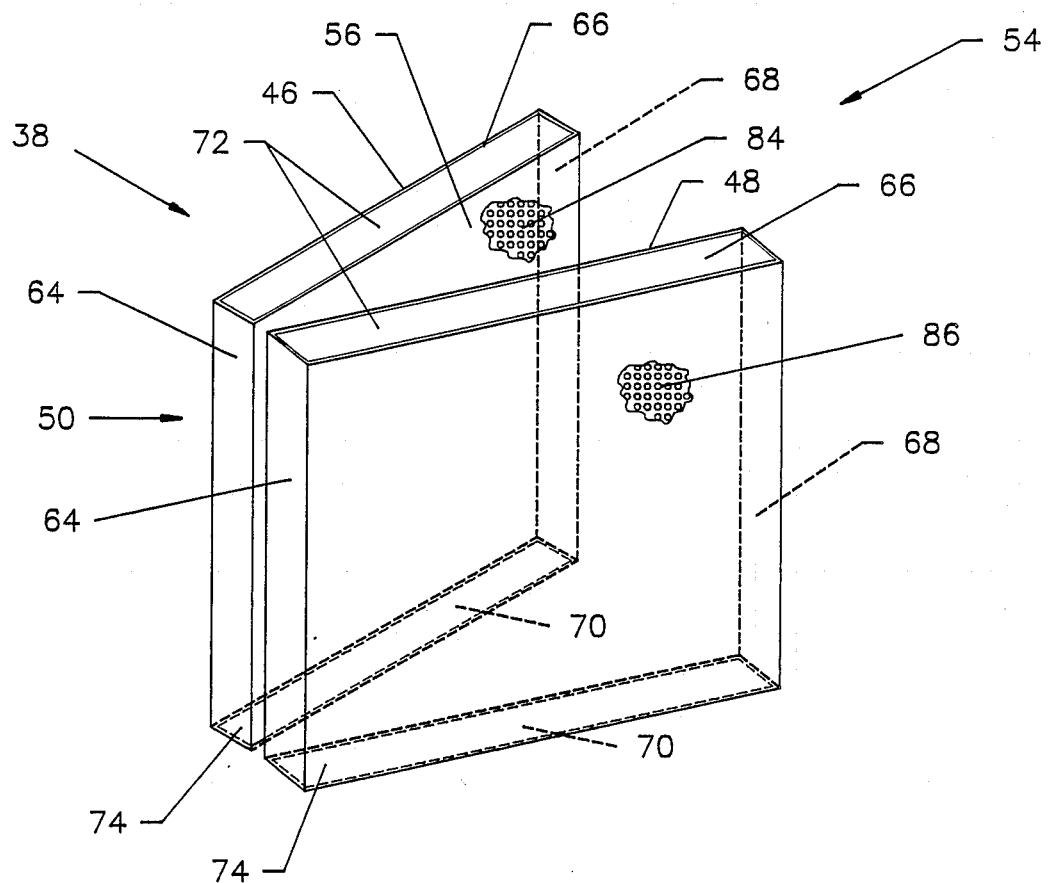
FIG. 5 is a perspective view of a portion of the V-shaped housing of the apparatus of FIG. 1.

V-shaped housing 38, shown also in FIGS. 4 and 5, has two vertical legs 46 and 48 extending from apex end 50 and forming acute angle 52 with prong end 54. Legs 46 and 48 of V-shaped housing 38 have inward vertical walls 56 and outward vertical walls 60. Connecting walls 64 and 68 connect and close the periphery of walls 56 and 58 on apex end 50 and prong end 54, respectively.

Top 66 is fitted with cover 80 as shown in detail in FIG. 6. When cover 80 is removed the interiors of housing legs 46 and 48 are completely exposed thereby enabling, and providing means for, charging of the V-shaped housing with fresh adsorbent particles or adsorbent. In one embodiment of this invention bottom 70 is fitted with cover 81 as also shown in FIG. 6. When cover 81 is removed the interiors of housing legs 46 and 48 are completely exposed thereby enabling, and providing means for, discharging of spent adsorbent particles from the V-shaped housing.

Removable covers 80 and 81 shown in FIG. 6, fit over top 66 and bottom 70, respectively, and provides means for opening and closing the top and bottom of V-shaped housing. Bolts 82, which are fastened to top flange 83 and bottom flange 85, provides means for securing covers 80 and 81 and gaskets 86 tightly against top 66 and bottom 70, respectively, of V-shaped housing 38. Bolts 82 are not shown in FIGS. 1 and 2 so that the other elements can be seen more clearly.

Vertical walls 56 and 60 contain a plurality of small apertures 84 and 86, respectively, operable for allowing contaminated gas to flow into V-shaped housing 38 through apertures 84 in inward vertical wall 56, thence through the bed of activated adsorbent particles contained in the V-shaped housing, and thence out of the V-shaped housing through apertures 86 in outward vertical wall 60. It is to understood that apertures 84 and 86 extend over all or almost all of the surface of inward vertical walls 56 and outward vertical walls 60. In FIG. 5 apertures 84 and 86 are shown only in a small area of the vertical walls so that the other elements can be seen more clearly.

Figure 2:
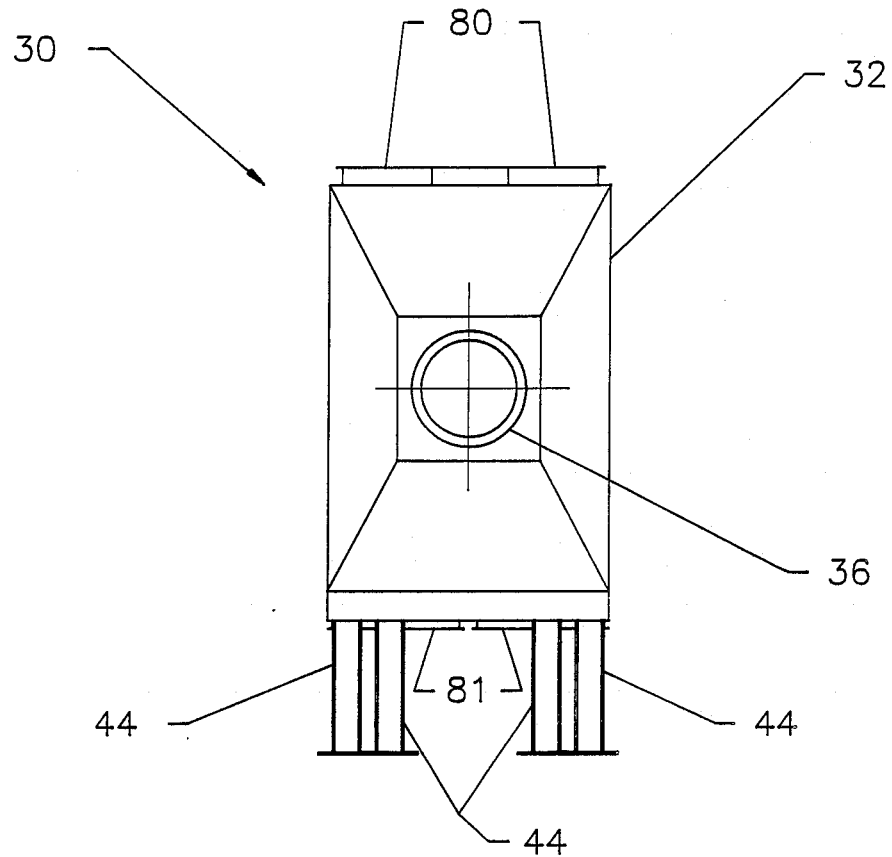
FIG. 2 is a rear elevational view of the apparatus of FIG. 1 showing the inlet side thereof.

As shown in FIGS. 1, 2 and 6, V-shaped housing 38 extends beyond the plenum chamber at both the top and the bottom thereof thereby forming a top extension and a bottom extension. In particular the top of the V-shaped housing 38 extends at least one bed width over the top of the plenum chamber. Accordingly refering to FIG. 6, where W represents the width of the bed of adsorbed particles, and X represents the extension of the bed of adsorbent particles over top 88, the extension X must be equal to or greater than bed width W. This prevents short circuiting of the treated gas stream by merely flowing over the top of the bed when settling of the filter particles occurs. Therefore even if some settling of the bed occurs, short circuiting of the gas flow over the top of the adsorbent particles in the V-shaped housing is prevented by the additional bed height provided by the upper extended portion of the housing. Therefore the top extension is important to the successful operation of the filtration apparatus. It has been found that when the top extension is omitted short circuiting of gas flow over the top of the bed of filter particles occurs thereby causing the adsorption of contaminants from the gas stream to be incomplete and unsatisfactory for many purposes.

A similar extension is preferably provided to the bottom of V-shaped housing 38. Systems with a bottom extension are preferred because such extensions enables the filtration particles to be removed more easily as will be explained more fully in the discussion of FIGS. 15 to 19, however, if desired the bottom extension can be omitted and is omitted in some embodiments.

In one embodiment acute angle 52 between legs 44 and 46 is from about 20 degrees to about 30 degrees. By having a relatively small acute angle between the legs of the V-shaped housing the overall width of the filtration apparatus is greatly reduced without sacrificing filtration area of the bed of activated filter particles, or, stated another way without sacrificing the adsorbance capacity of the apparatus.

In one embodiment apertures 84 and 86 are circular, 1/16 inch in diameter, with centers spaced apart 3/32 inch in an equilateral triangular pattern over vertical walls 56 and 60.

In one version of the embodiment shown in FIGS. 1 to 6, vertical walls 56 and 60 are 8 ft. in effective width and extend through the top and bottom of a plenum chamber which is 8 ft. in height thereby providing two effective adsorbent bed areas about 8 ft. by 8 ft. each for a nominal filtration area of 128 sq. ft. In this version of this embodiment, inward wall 56 is spaced nominally about 1 ft. from outward wall 60 thereby providing a nominal effective bed capacity of 128 cubic ft. for containment of the bed of adsorbent particles. The one foot separation of inward and outward vertical walls is sufficiently large that filter particles will not bridge in the V-shaped housing during charging, thereby allowing uniform adsorbent particle bed densities to be formed in the V-shaped housing, and also sufficiently large for allowing complete removal of spent adsorbent particles from the V-shaped housing without considerable effort such as scraping and hammering to dislodge spent adsorbent particles that have formed bridges in the V-shaped housing. The bed extends an additional one foot above and below the plenum chamber to prevent short circuiting of the gas over the top of the bed when settling occurs. In this particular size model of this embodiment the nominal longitudinal length of plenum chamber 32 is 14 ft., and the nominal maximum width of the chamber is 5 ft., and inlet 36 and outlet 34 are nominally 2 ft. in diameter.

Inside of chamber 32, abutted in sealed relationship against prong end 54, is a prefilter assembly 90 which provides means for filtering and removing particulate matter from the contaminated gas stream prior to contacting the gas stream with the bed of adsorbent particles contained in V-shaped housing 38.

Figure 3:
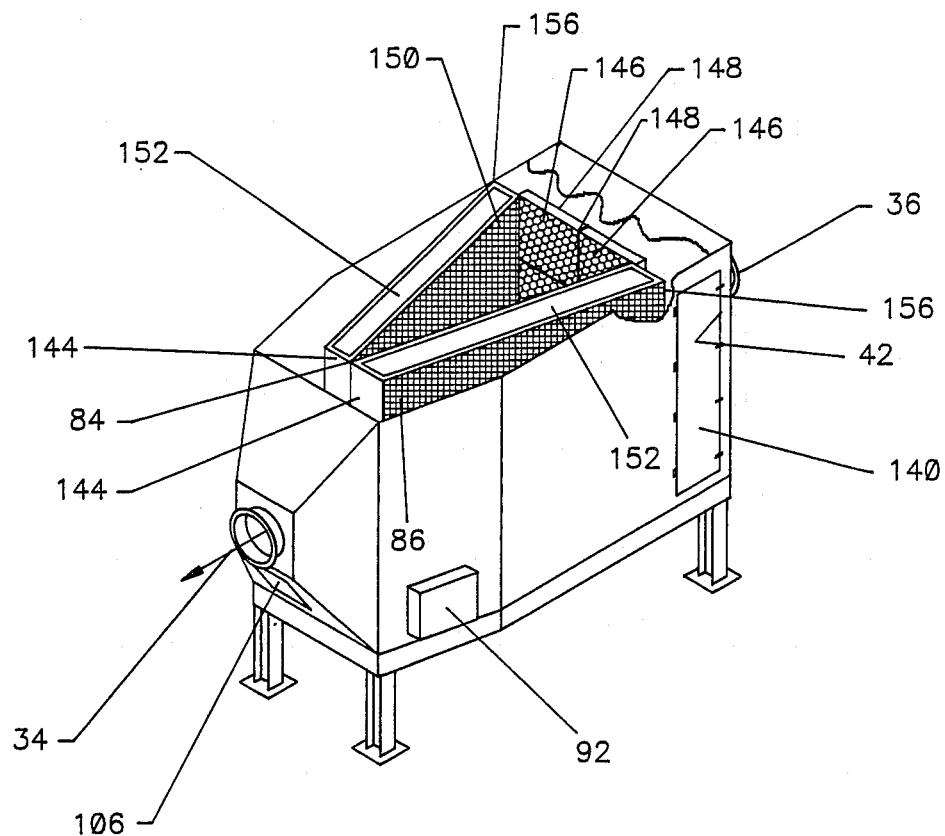
FIG. 3 is another perspective view of the apparatus of FIG. 1 with the top of the plenum chamber broken away to show the V-shaped housing and particulate removal filters and support frame.

A break-away view of embodiment 30 of this invention is shown in FIG. 3 which will be explained in more detail later.

In one particular size model of this embodiment, prefilter 90 is about 8 ft. in height and about 3 ft. in width thereby providing a nominal filtration area of about 24 sq. ft. In one embodiment the filtration media of prefilter 90 is spun fiber glass wool. In another embodiment prefilter 90 is a conventional disposable filter element.

Attached to the lower side of plenum chamber 32 is instrumentation panel 92 which houses gages for measuring the pressure drop across prefilter 90 and V-shaped housing 38. Non-limiting examples of pressure gages suitable for measuring such pressures are Dyer Series 2000 magnahelix and Dyer Series 3000 photohelix type differential pressure gages. These gages are connected in a conventional manner to a point upstream of prefilter 90, a point downstream of the prefilter but upstream of housing 38, and a point downstream of housing 38.

In embodiment 30 of the filtration apparatus of this invention, a ladder (not shown) is permanently connected to the lower part of plenum chamber 32 to facilitate entry into chamber 32 through door 40. Door 40 is sufficiently large to permit an adult man to enter the inside of the chamber to remove and replace prefilter 90.

A ladder (not shown) permanently connected to the vertical side of plenum chamber 32 is provided to facilitate reaching the top of the plenum chamber for purposes of filling V-shaped housing 38 with adsorbent particles through top 66.

In the following embodiments of this invention, elements and components which are identical or nearly identical have the same element number.

Figure 7:
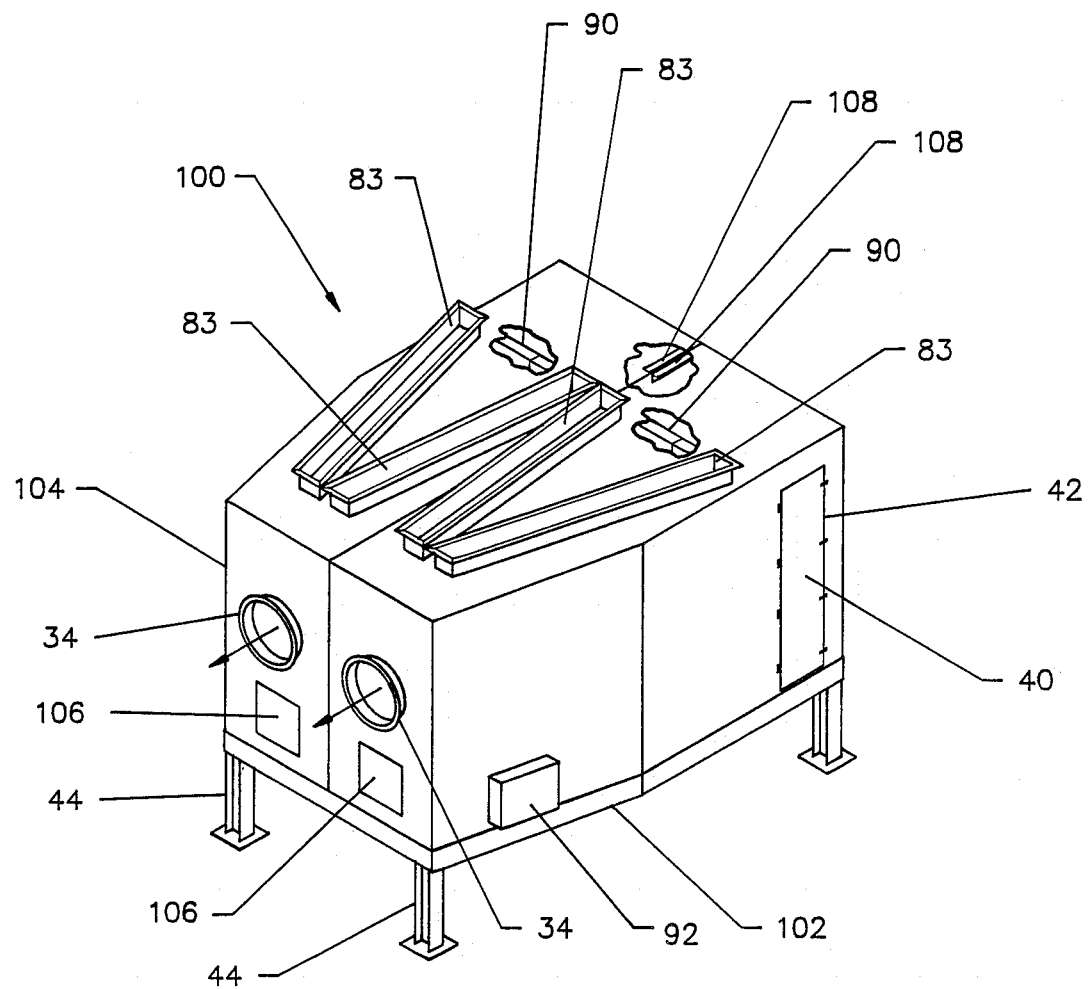
FIG. 7 is a perspective view of a second embodiment for a filtration system of this invention showing two filtration apparatuses similar to that of FIG. 1 arranged in parallel.
Figure 8:
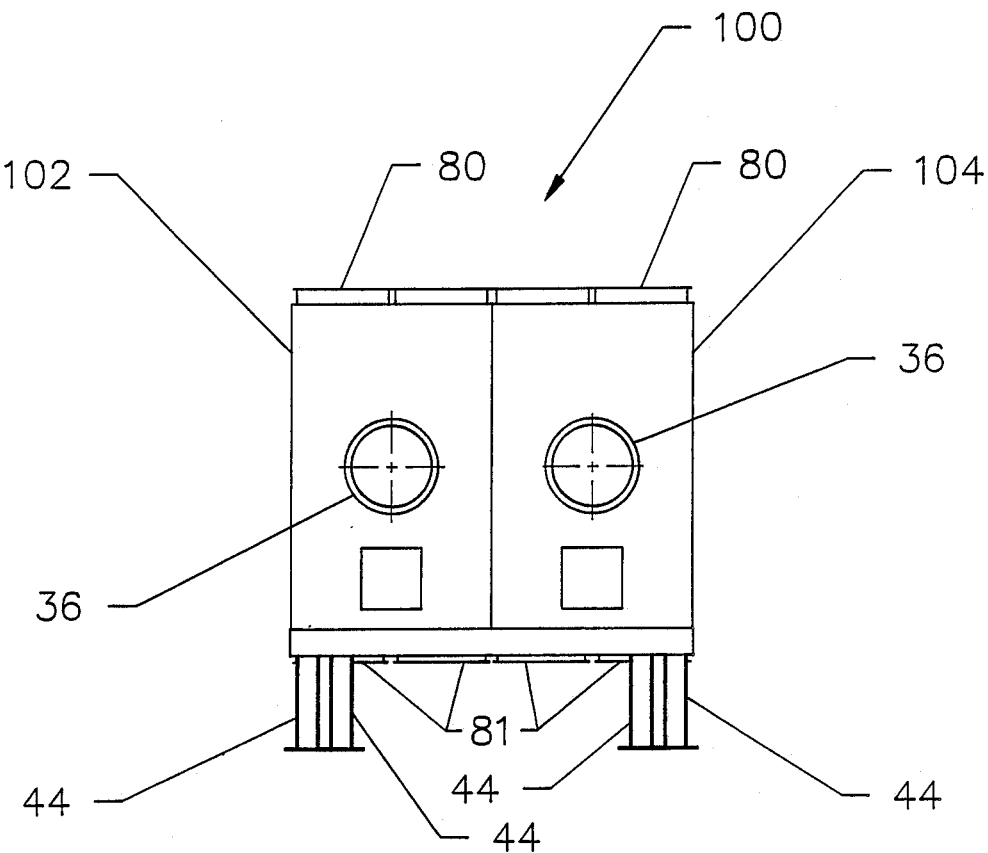
FIG. 8 is a rear elevational view of the system of FIG. 7 showing the inlet side thereof.

A second filtration system of this invention, generally designated by 100, consisting of two filtration units similar in size to that of FIG. 1, is shown in a parallel arrangement in FIGS. 7 and 8. It can be seen that the shape of chambers 102 and 104 are slightly different than that of chamber 32; however, two chambers identical to chamber 32 could be used if desired. In this embodiment separate inlets 36 and separate outlets 34 are provided for each V-shaped housing of chamber 102 and 104. Entry into the inlet or prefilter side of plenum chambers 102 and 104 is through door 40. Only one door is needed since there is no interior wall separating plenum chamber 102 and 104. Therefore adjacent V-shaped housings are provided with a means for sealing or closing off the space between adjacent prong ends of the V-shaped housing so that gas can not flow between the V-shaped housings. Entry into the outlet section of the plenum chamber 102 and 104 for maintenance purposes is through removable covers 106 which are bolted and sealed to plenum chambers in a conventional manner. The adjacent peripheries of plenum chambers 102 and 104 are permanently connected and sealed to each other by angular brackets 108 which are sealed by gasket and bolted together or welded together.

In one particular size model of embodiment 100, the nominal longitudinal length of the system is about 14 ft., the nominal width about 10 ft., with a nominal effective filtration area of the bed of adsorbent particles of about 256 sq. ft.

Figure 9:
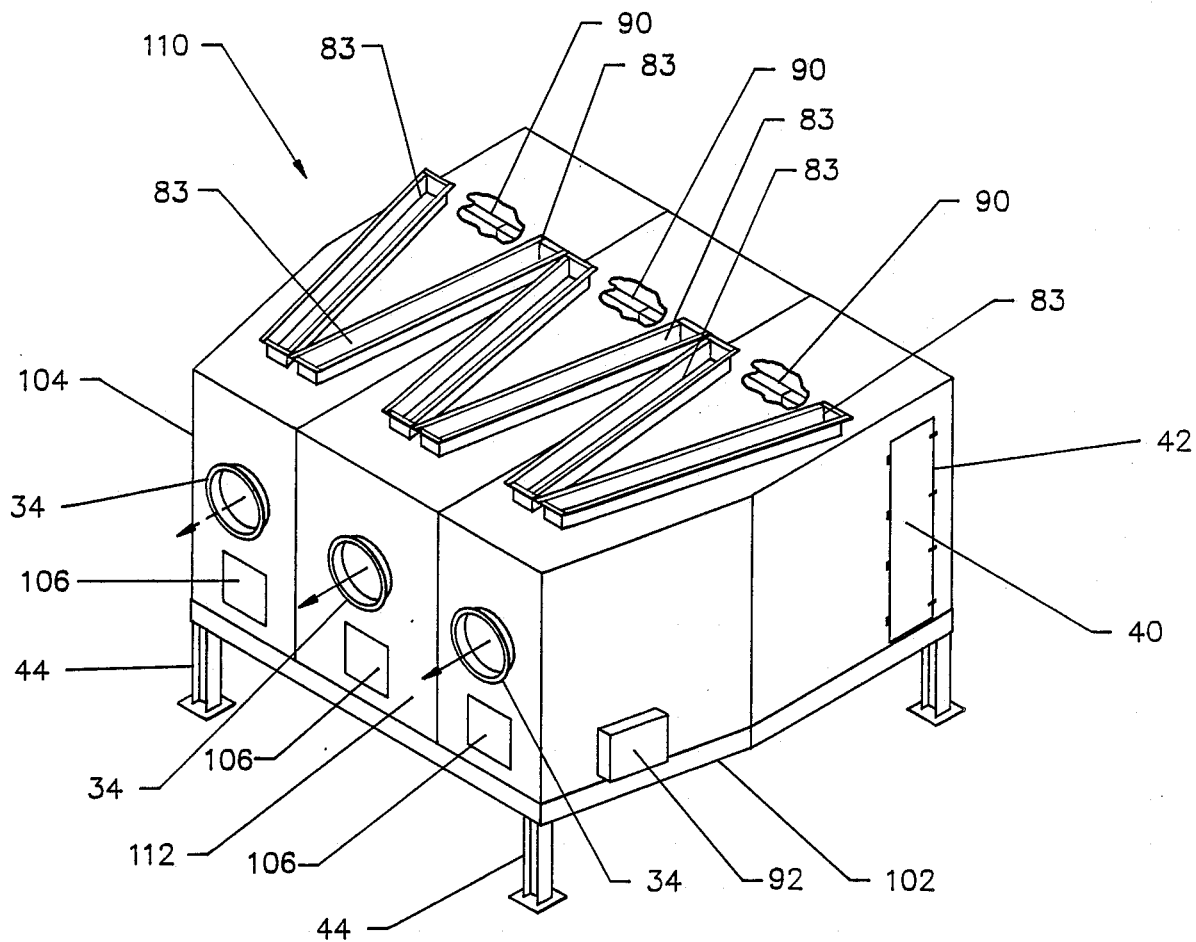
FIG. 9 is a perspective view of a third embodiment of the filtration system of this invention showing three filtration apparatuses similar to that of FIG. 1 arranged in parallel.
Figure 10:
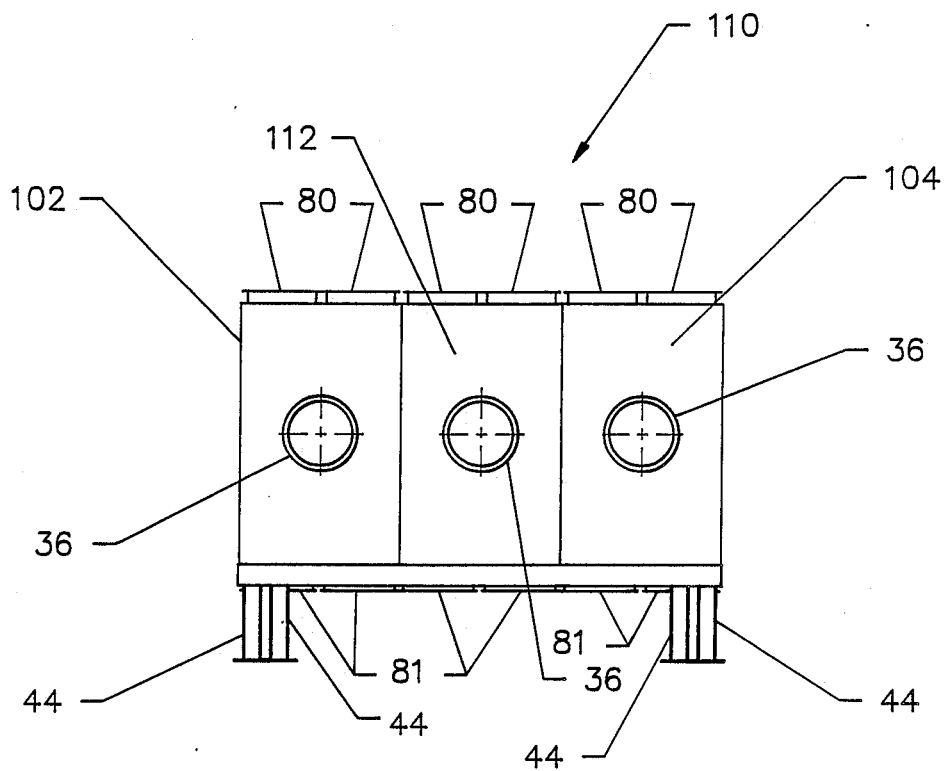
FIG. 10 is a rear elevational view of the system of FIG. 9 showing the inlet side thereof.

A third embodiment of a filtration system of this invention, generally designated by 110, is shown in FIGS. 9 and 10. Filtration system 110 comprises three filtration units, 102, 112 and 104, each unit being somewhat similar to that of filtration apparatus 30 of FIG. 1, and connected together in a parallel arrangement. Inlets 36, and outlets 34 are provided for each V-shaped housing of each chamber. Doorway 40 also provides means for entering the inside of chambers 112 and 104 to remove and replace prefilters 90. Prefilters 90 are connected across the prong end 54 of each V-shaped housing in each plenum chamber module in a manner similar to embodiment 30. In one particular size model of embodiment 110 the nominal longitudinal length of the system is about 14 ft., the nominal width about 15 ft., with a nominal effective filtration area of the bed of adsorbent particles of about 384 sq. ft.

Figure 11:
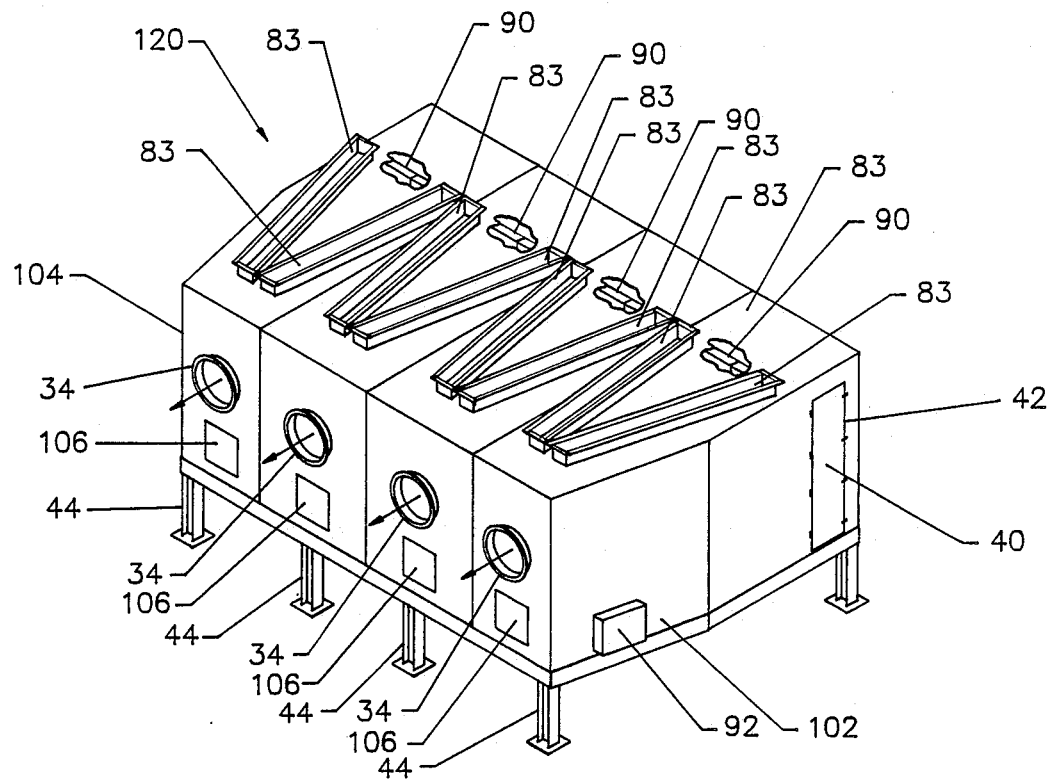
FIG. 11 is a perspective view of a fourth embodiment of the filtration system of this invention showing four filtration apparatuses similar to that of FIG. 1 arranged in parallel.
Figure 12:
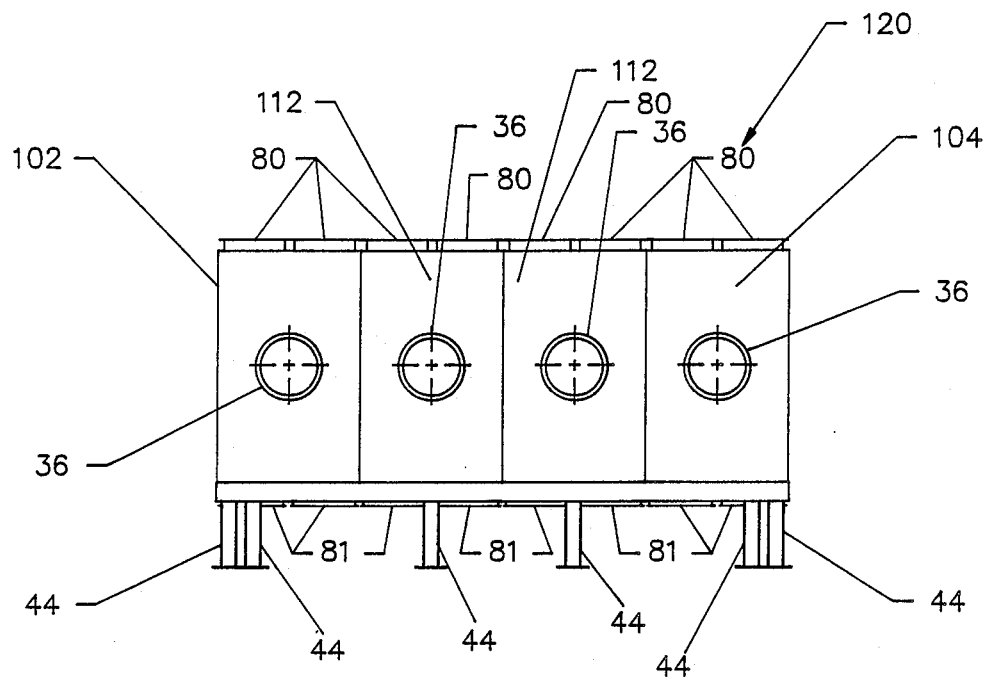
FIG. 12 is a rear elevational view of the system of FIG. 11 showing the inlet side thereof.

A fourth embodiment of a filtration system of this invention, generally designated by 120, is shown in FIGS. 11 and 12. System 120 comprises four filtration units, 102, 112, 112 and 104, similar to that of filtration apparatus 30 of FIG. 1, connected together in parallel arrangement. Inlets 36 and outlets 34 are provided for each V-shaped housing of each plenum chambers. In one particular size model of embodiment 120 the nominal longitudinal length of the system is about 14 ft., the nominal width about 20 ft., with a nominal effective filtration area of the bed of adsorbent particles of about 512 sq. ft.

Figure 13:
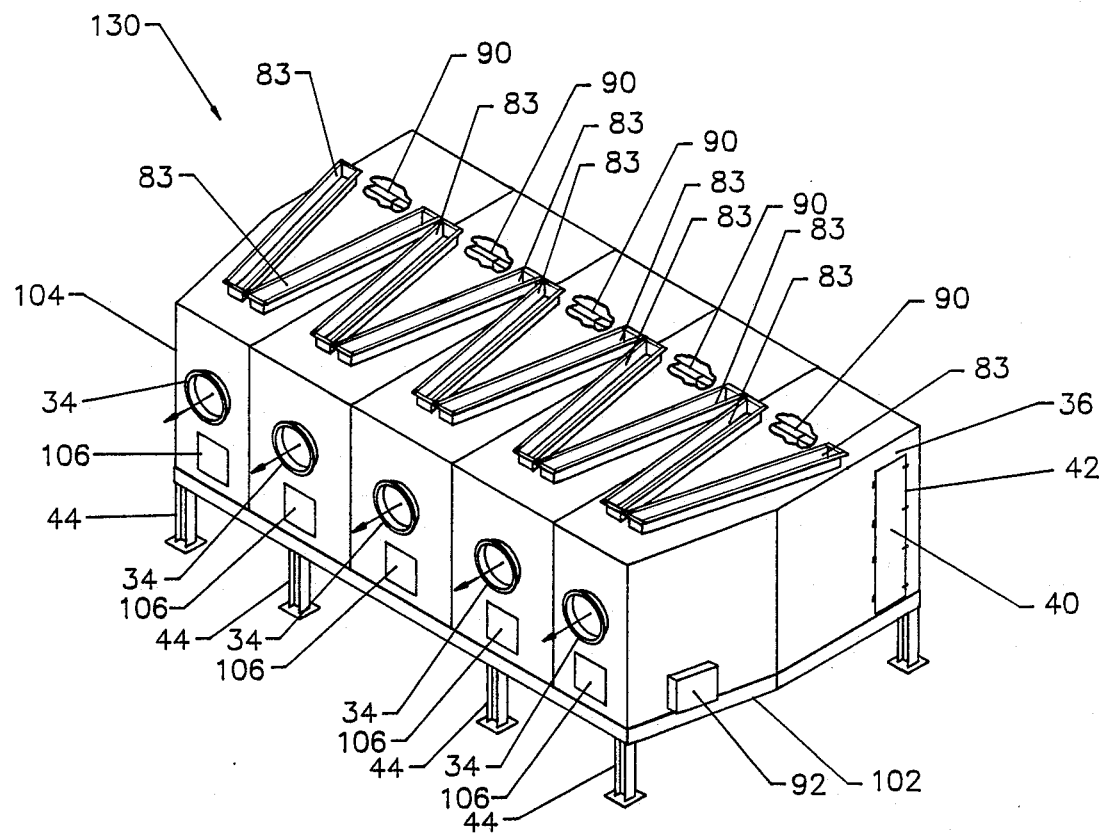
FIG. 13 is a perspective view of a fifth embodiment of the filtration system of this invention showing five filtration apparatuses similar to that of FIG. 1 arranged in parallel.
Figure 14:
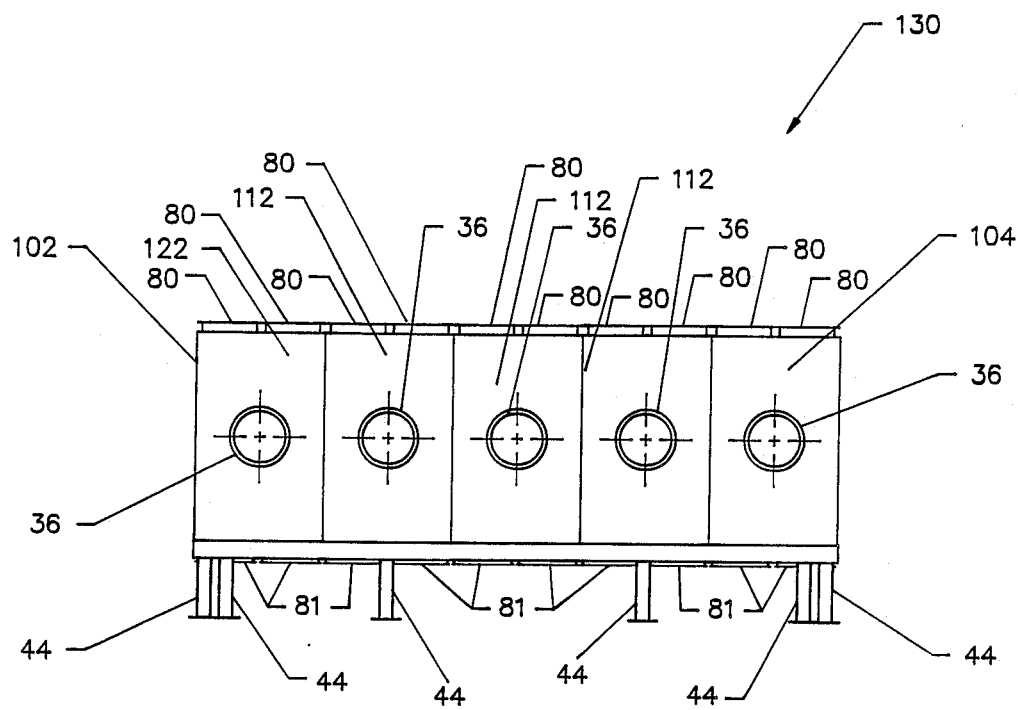
FIG. 14 is a rear elevational view of the system of FIG. 13 showing the inlet side thereof.
Figure 15:
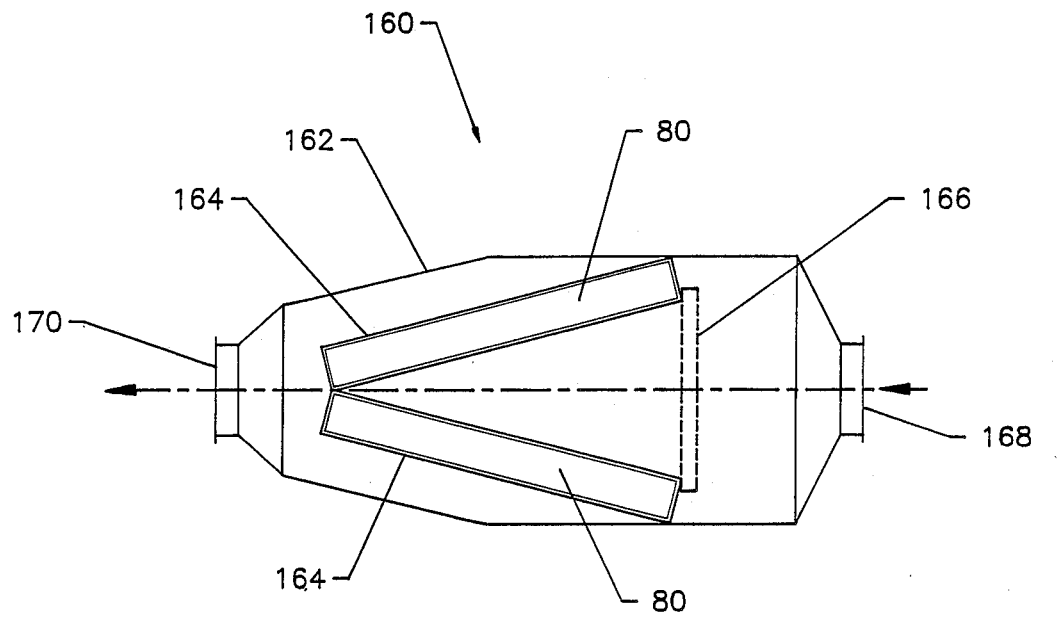
FIG. 15 is a top plan view of a sixth embodiment of the filtration apparatus of this invention showing the V-shaped housing extending above the top of the plenum chamber.
Figure 16:
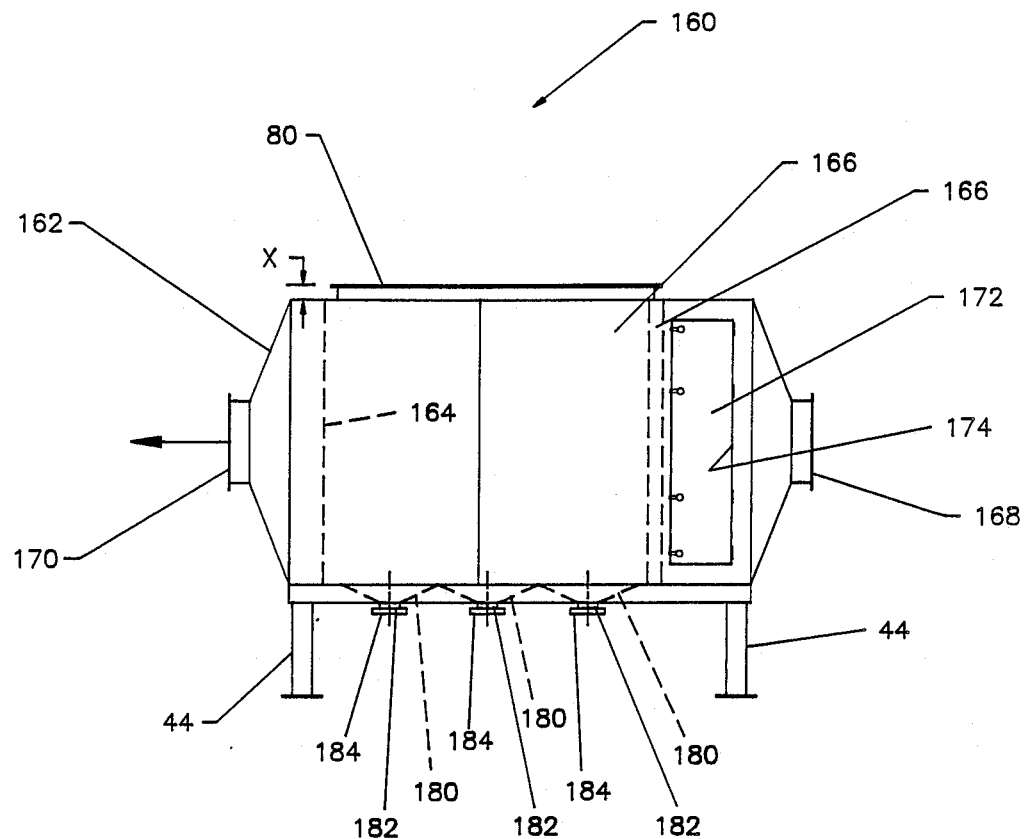
FIG. 16 is a right side elevational view of the apparatus of FIG. 15.
Figure 17:
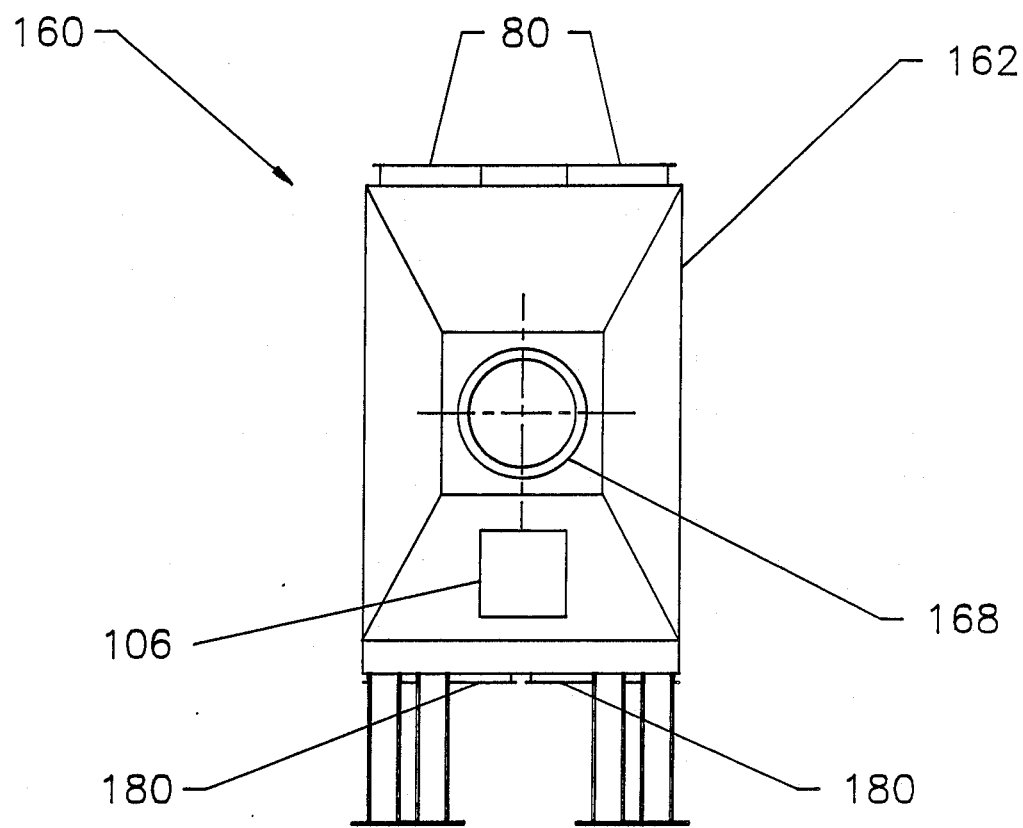
FIG. 17 is a rear elevational view of the inlet side of the apparatus of FIG. 15.

A fifth embodiment of a filtration system of this invention, generally designated by 130, is shown in FIGS. 13 and 14. System 130 comprises five filtration units, 102, 112, 112, 112 and 104, each somewhat similar to apparatus 30 of FIG. 1, connected together in parallel arrangement. Inlets 36 and outlets 34 are provided for each V-shaped housing of each chamber. In one particular size model of embodiment 130 the nominal longitudinal length of the system is about 14 ft., the nominal width about 25 ft., with a nominal effective filtration area of the bed of adsorbent particles of about 640 sq. ft.

Embodiments 30, 100, 110, 120 and 130 demonstrate a principal advantage of the filtration apparatus of this invention, which allows a predetermined number of individual V-shaped housings or plenum chambers to be connected together in a parallel arrangement to treat any volume of gas flow. It can be seen that a filter unit, similar in shape to that of module 112, can be connected in parallel arrangement with other similar units in any desired number. All inlets 36 and outlets 34 can be connected to an external inlet manifold and external outlet manifold (not shown), respectively. Alternately, only a select number of the inlets and outlets can be connected to external manifolds with remaining inlets 36 and outlets 34 closed off since the space between adjacent V-shaped housings is sealed and there are no dividing walls between adjacent plenum chambers. The adjacent peripheries of plenum chambers are permanently connected and sealed to each other by angular brackets 108 which are fitted with gaskets and bolted together or welded together.

Returning to FIG. 3, FIG. 3 is broken away to show the portion of the V-shaped housing within the main part of the plenum chamber and its prefilter assembly. The prefilter assembly in this embodiment comprises eight 2 ft.×2 ft. ×4 inch conventional filter elements, 146, secured by frame 148 which provides means for holding such filter elements in parallel-flow relationship to each other in a vertical plane traverse to the longitudinal axis of the chamber. Frame 148 also provides means for causing all of the gas entering the inlet of the chamber to flow through filter elements 146 and thence into enclosed zone 150 formed by (i) the inward vertical walls of the legs of the V-shaped housing, (ii) a portion of the top of the plenum chamber, (iii) a portion of the bottom of the plenum chamber, and (iv) prefilter elements 146. Vertical edges 156 of V-shaped housing 144 are sealed against the adjacent side of plenum chamber 142, preferably by C-shaped channel and caulking as will be explained below, thereby providing sealing means for causing, when the apparatus is filtering gas, all of the gas which flows out of enclosed zone 150 and outlet 34 to flow through small apertures 84 in the inward vertical walls, thence through the bed of adsorbent particles in V-shpaed housing 144, thence through small apertures 86 in the outward vertical walls of the V-shaped housing. The sealing means preferably comprises a C-shaped channel adapted to receive the V-shaped housing and welded to the inside of the plenum chamber and a caulk seal between the C-shaped channel and the V-shaped housing. Alternately the sealing means can comprise welding of the V-shaped housing to the surface of the plenum chamber or gaskets placed between the V-shaped housing and chamber.

A sixth embodiment of this invention, generally designated by 160, is shown in FIGS. 15 to 19. Embodiment 160 comprises plenum chamber 162, V-shaped housing 164,, prefilter 166, inlet 168, outlet 170, door 172, and doorway 174. V-shaped housing 164 extends through the top of chamber 162 and has a removable cover 80 for filling the V-shaped housing with activated adsorbent particles. The bottom of V-shaped housing 164 extends through the bottom of chamber 162 and is connected by conical members 180 to slide valves 182 to outlets 184.

Figure 18:
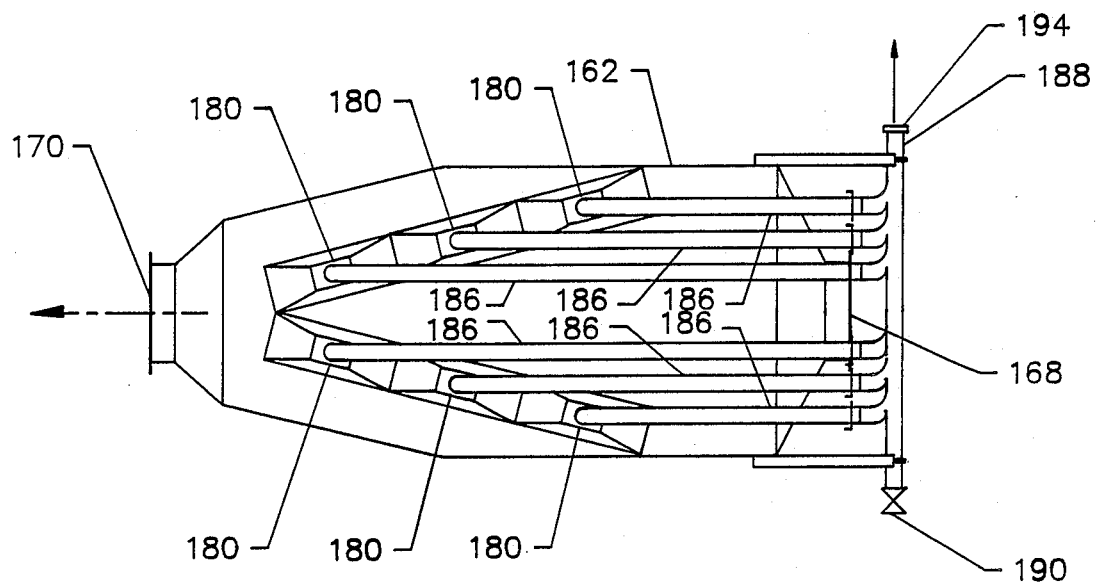
FIG. 18 is a bottom plan view of the apparatus of FIG. 15 with a discharge manifold connected to the bottom of the V-shaped housing.
Figure 19:
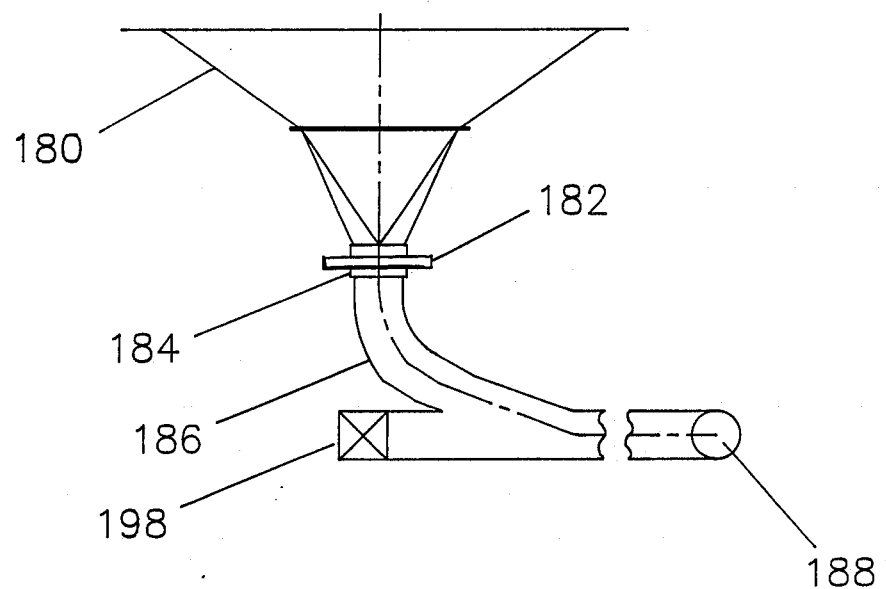
FIG. 19 is a right side elevational view of a portion of the manifold of FIG. 18.

Outlets 184 are connected by manifold members 186, FIGS. 18 and 19, to discharge conduit 188. Manifold members 186 preferably remain attached to outlets 184. Alternately, manifold members 186 can be reinstalled for each recharging of fresh filter particles. Each manifold member 186 has a valve 198 as shown in FIG. 19. Valve 190 and valves 198 serve as means for introducing air into conduit 188 during the initial phase of discharging spent filter particles from the system. Slide valves 182 and valves 198 are not shown in FIG. 18 so that conical members 180 and manifold members 186 can be more easily shown.

Coupling 194 is used to connect a hose to a cyclone separator-blower-storage vessel system (not shown) for removal and storage of the spent filter particles from the V-shaped housing.

Figure 20:
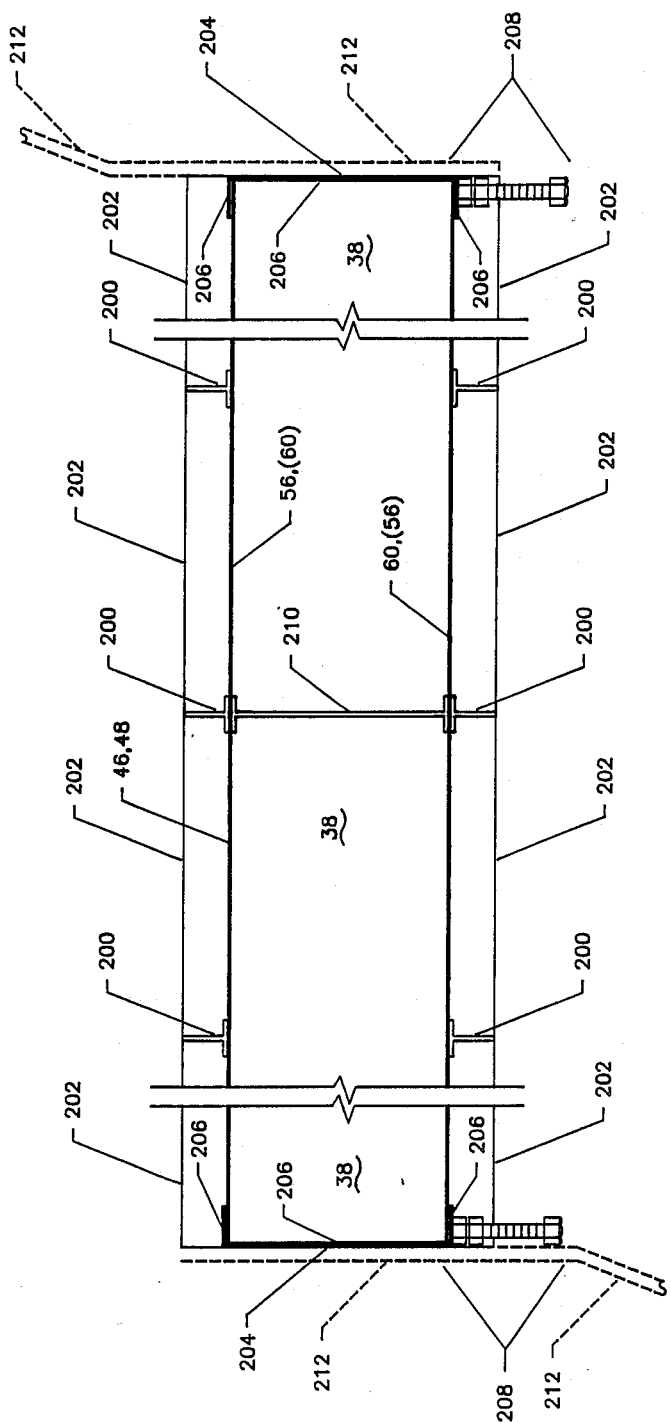
FIG. 20 is a top plan view of means for positioning and sealing the V-shaped housing in the plenum chamber.

The positioning and sealing of V-shaped housing 38 in plenum chambers with the C-shaped channels referred to above will be now be explained with reference to FIG. 20. FIG. 20 is a top plan view of means for positioning and sealing V-shaped housing 38 in plenum chamber 32. T-bars 200 and angle support frame 202 provide means for positioning V-shaped housing 38 in plenum chamber 32. C-shaped channel 204 provides means for sealing V-shaped housing 38 in plenum chamber 32. In this embodiment C-shaped channels 204 are welded to angle support frame 202. Space 206 between C-shaped channel 204 and V-shaped housing 38 is filled with an effective caulking material and jam nut/bolt assemblies 208 tightened to secure and seal V-shaped housing 38 to C-shaped channels 204. One or more spacer elements 210 are placed longitudinally inside each leg 46 and 48 of the V-shaped housing. Spacer elements 210 span between the inward and outward vertical walls 56 and 60 in the portion thereof containing small apertures 84 and 86, respectively, i.e. the screen area, and provide means for supporting the screen area of the vertical walls. In embodiments employing multiple plenum chambers parallel connected, as in embodiments 100, 110, 120 and 130, bracket members 212 are secured to C-shaped channels 204. Bracket members 212 provide means for parallel connecting and sealing adjacent V-shaped housings 38 together.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A gas filtration apparatus comprising:
   a plenum chamber having an inlet, an outlet, a top surface, and a bottom surface;
   a V-shaped housing having a main portion thereof located inside the plenum chamber, an upper portion extending outside of the plenum chamber and above the top surface thereof, the V-shaped housing also having two vertical legs extending from a vertically oriented apex end of the V-shaped housing and forming an acute angle between the vertical legs and a vertically oriented prong end opposite the apex end, the apex end being proximate the outlet of the plenum chamber, the prong end being proximate the inlet of the plenum chamber, each of the vertical legs having an inward vertical wall and an outward vertical wall, the distance between the inward and outward vertical walls defining a first length, a second length defined by the distance that the upper portion of the V-shaped housing extends above the top surface of the plenum chamber, the second length being at least as great as the first length;
   vertical connecting walls connecting and closing the vertical periphery of the inward and outward vertical walls at the apex end and the prong end of each leg of the V-shaped housing;
   a plurality of small apertures in the inward and outward vertical walls of each vertical leg in the main portion of the V-shaped housing, the plurality of apertures being operable for permitting gas to flow through the V-shaped housing, each of the legs of the V-shaped housing being operable for holding a predetermined amount of adsorbent particles;
   sealing means for sealing the main portion of the V-shaped housing in the plenum chamber and for causing, when the apparatus is filtering gas, all of the gas which flows out of the outlet of the apparatus to flow first through the plurality of small apertures in the inward vertical walls of the V-shaped housing, thence through the outward vertical walls of the V-shaped housing, and thence out of the apparatus through the outlet of the plenum chamber;
   first means for opening and closing the upper portion of the V-shaped housing; and
   second means for opening and closing the lower portion of the V-shaped housing.

2. The apparatus of claim 1, wherein the distance between the inward and outward vertical walls of the V-shaped housing is sufficiently large that adsorbent particles will not bridge in the housing, thereby allowing uniform adsorbent particle bed densities to be formed in the housing, and, also allowing for complete removal of spent adsorbent particles from the housing.

3. The apparatus of claim 1, further comprising prefilter means for filtering and removing particulate matter from a gas stream, the prefilter means being in the plenum chamber between the inlet thereof and the V-shaped housing.

4. A gas filtration apparatus comprising:
   a plenum chamber having an inlet, an outlet, a top surface, and a bottom surface;
   support means attached to the inside of the plenum chamber, the support means holding a predetermined number of one or more filter elements in parallel-flow relationship to each other in a vertical plane of the plenum chamber;
   a V-shaped housing having a main portion thereof located inside the plenum chamber between the support means and the outlet of the plenum chamber, an upper portion extending outside of the plenum chamber and above the top surface thereof and a lower portion extending outside of the plenum chamber and below the bottom surface thereof, the V-shaped housing also having two vertical legs extending from a vertically oriented apex end of the V-shaped housing and forming an acute angle between the vertical legs and a vertically oriented prong end opposite the apex end, the apex end being proximate the outlet of the plenum chamber, the prong end being proximate the support means, each of the vertical legs having an inward vertical wall and an outward vertical wall, the distance between the inward and outward vertical walls defining a first length, a second length defined by the distance that the upper portion of the V-shaped housing extends above the top surface of the plenum chamber, the second length being at least as great as the first length;
   vertical connecting walls connecting and closing the vertical periphery of the inward and outward vertical walls at the apex end and the prong end of each leg of the V-shaped housing;
   a plurality of small apertures in the inward and outward vertical walls of each vertical leg in the main portion of the V-shaped housing, the plurality of apertures being operable for permitting gas to flow through the V-shaped housing, each of the legs of the V-shaped housing being operable for holding a predetermined amount of adsorbent particles;

an enclosed zone formed by the inward vertical walls of the legs of the V-shaped housing, a portion of the top and bottom of the plenum chamber, the support means and the predetermined number of one or more filter elements;

first sealing means for causing, when the apparatus is filtering gas, gas entering the inlet of the plenum chamber to flow through the predetermined number of one or more filter elements and thence into the enclosed zone;

second sealing means for sealing the main portion of the V-shaped housing in the plenum chamber and for causing, when the apparatus is filtering gas, all of the gas in the enclosed zone to flow out of the enclosed zone through the plurality of small apertures in the inward vertical walls of the V-shaped housing, thence through the outward vertical walls of the V-shaped housing, and thence out of the apparatus through the outlet of the plenum chamber;

first means for opening and closing the upper portion of the V-shaped housing; and second means for opening and closing the lower portion of the V-shaped housing, whereby, when the apparatus is filtering a gas, gas entering through the inlet of the plenum chamber will flow in series, first through the predetermined number of one or more filter elements, thence into the enclosed zone, thence through the small apertures in the inward vertical walls of the housing, thence through the adsorbent particles contained in the housing, thence through the small apertures in the outward vertical walls of the housing, and thence out of the plenum chamber through the outlet thereof.

5. The apparatus of claim 4, wherein the acute angle formed by the vertical legs of the V-shaped housing is from about 15 to about 45 degrees.

6. The apparatus of claim 4, wherein the acute angle formed by the vertical legs of the V-shaped housing is from about 25 to about 35 degrees.

7. The apparatus of claim 4, wherein the acute angle formed by the vertical legs of the V-shaped housing is about 30 degrees.

8. The apparatus of claim 4, wherein the second length is about the same as the first length.

9. The apparatus of claim 4, wherein the second means for opening and closing the lower portion of the V-shaped housing comprises at least one valve on each of the vertical legs of the V-shaped housing.

10. The apparatus of claim 4, further comprising at least one conical transitional member connected to each of the vertical legs of the V-shaped housing, and wherein the second means for opening and closing the lower portion of the V-shaped housing comprises a valve on each of the conical transitional members.

11. The apparatus of claim 4, further comprising at least one conical transitional member connected to each of the vertical legs of the V-shaped housing, wherein the second means for opening and closing the lower portion of the V-shaped housing comprises a valve on each of the conical transitional members, and further comprising a manifold member having an inlet and an outlet, the manifold inlet being connected to each of the valves, and a discharge conduit having a plurality of inlets and an outlet, each manifold outlet being connected to a discharge conduit inlet.

12. The apparatus of claim 4, wherein the ratio of the height-to-length of each leg of the V-shaped housing is from about $\frac{1}{2}$ to about 2, and the ratio of the distance between the inward and outward vertical walls of each leg to the length of the leg is from about 0.01 to about 0.3.

13. The apparatus of claim 4, wherein the ratio of the height-to-length of each leg of the V-shaped housing is from about $\frac{3}{4}$ to about 3/2, and the ratio of the distance between the inward and outward vertical walls of each leg to the length of the leg is from about 0.05 to about 0.2.

14. The apparatus of claim 4, wherein the ratio of the height-to-length of each leg of the V-shaped housing is about one, and the ratio of the distance between the inward and outward vertical walls of each leg to the length of the leg is about 0.013.

15. The apparatus of claim 4, wherein each leg of the V-shaped housing has a length from about 1 to about 10 meters, a height of from about 1 to about 10 meters, and the distance between the inward and outward vertical walls of each leg is from about 0.1 to about 0.5 meters.

16. The apparatus of claim 4, wherein each leg of the V-shaped housing has a length of about 2.5 meters, a height of about 2.5 meters, and the distance between the inward and outward vertical walls of each leg is about 0.3 meters.

17. The apparatus of claim 4, wherein the plurality of small apertures in each of the vertical walls are circular and have a diameter from about 0.1 to about 0.2 centimeters, and the centers of the circular apertures are spaces apart from about 0.2 to about 0.4 centimeters in an equilateral triangular pattern.

18. The apparatus of claim 4, wherein the predetermined number of one or more filter elements consist of eight conventional filter elements operable for removing particles from gas flowing through such filter elements.

19. The apparatus of claim 4, wherein the predetermined number of one or more filter elements consist of eight conventional filter elements operable for removing particles from gas flowing through such filter elements, and wherein each of the filter elements contains spun fiber glass wool and has a nominal size of about 0.3 meters by about 0.3 meters by about 0.1 meters.

20. The apparatus of claim 4, further comprising a C-shaped channel permanently attached and sealed to the plenum chamber, wherein the V-shaped housing is sealably attached to the C-shaped channel by caulk.

21. The apparatus of claim 4, further comprising means for parallel connecting the V-shaped housing to another V-shaped housing.

22. The apparatus of claim 4, further comprising means for parallel connecting the V-shaped housing to two more V-shaped housings.

23. The apparatus of claim 4, further comprising a passageway and door therefor in one side of the plenum chamber upstream from the support means, the passageway being large enough to permit access of a person into the plenum chamber for the purpose of removing and replacing the predetermined number of one or more filter elements held by the support means.

24. The apparatus of claim 4, further comprising an opening and cover therefor in the plenum chamber downstream from the V-shaped housing, the opening and cover therefor providing means for entry into the plenum chamber for cleaning.

25. The apparatus of claim 4, the first means for opening and closing the upper portion of the V-shaped housing comprises a flange attached to the top of each vertical leg of the V-shaped housing, a cover for covering the flange of each vertical leg, and third sealing means for sealing the covers in air tight relationship to the flanges.

26. A gas filtration apparatus comprising:
a plenum chamber having an inlet, an outlet, a top surface, and a bottom surface;
support means attached to the inside of the plenum chamber, the support means holding a predetermined number of one or more filter elements in parallel-flow relationship to each other in a vertical plane of the plenum chamber;
a V-shaped housing having a main portion thereof located inside the plenum chamber between the support means and the outlet of the plenum chamber, an upper portion extending outside of the plenum chamber and above the top surface thereof and a lower portion extending outside of the plenum chamber and below the bottom surface thereof, the V-shaped housing also having two vertical legs extending from a vertically oriented apex end of the V-shaped housing and forming an acute angle between the vertical legs and a vertically oriented prong end opposite the apex end, the apex end being proximate the outlet of the plenum chamber, the prong end being proximate the support means, the acute angle being from about 15 to about 45 degrees, each of the vertical legs having an inward vertical wall and an outward vertical wall, the distance between the inward and outward vertical walls defining a first length, a second length defined by the distance that the upper portion of the V-shaped housing extends above the top surface of the plenum chamber, the second length being at least as great as the first length;
vertical connecting walls connecting and closing the vertical periphery of the inward and outward vertical walls at the apex end and the prong end of each leg of the V-shaped housing;
at least one conical transitional member connected to each of the vertical legs of the V-shaped housing;
a C-shaped channel permanently attached and sealed to the plenum chamber, wherein the V-shaped housing is sealably attached to the C-shaped channel by caulk;
a plurality of small apertures in the inward and outward vertical walls of each vertical leg in the main portion of the V-shaped housing, the plurality of apertures being operable for permitting gas to flow through the V-shaped housing, each of the legs of the V-shaped housing being operable for holding a predetermined amount of adsorbent particles;
an enclosed zone formed by the inward vertical walls of the legs of the V-shaped housing, a portion of the top and bottom of the plenum chamber, the support means and the predetermined number of one or more filter elements;
first sealing means for causing, when the apparatus is filtering gas, gas entering the inlet of the plenum chamber to flow through the predetermined number of one or more filter elements and thence into the enclosed zone;
second sealing means for sealing the main portion of the V-shaped housing in the plenum chamber and for causing, when the apparatus is filtering gas, all of the gas in the enclosed zone to flow out of the enclosed zone through the plurality of small apertures in the inward vertical walls of the V-shaped housing, thence through the outward vertical walls of the V-shaped housing, and thence out of the apparatus through the outlet of the plenum chamber;
a passageway and door therefor in one side of the plenum chamber upstream from the support means, the passageway being large enough to permit access of a person into the plenum chamber for the purpose of removing and replacing the predetermined number of one or more filter elements held by the support means;
an opening and cover therefor in the plenum chamber downstream from the V-shaped housing, the opening and cover therefor providing means for entry into the plenum chamber for cleaning;
first means for opening and closing the upper portion of the V-shaped housing which comprises a flange attached to the top of each vertical leg of the V-shaped housing, a cover for covering the flange of each vertical leg, and third sealing means for sealing the covers in air tight relationship to the flanges; and
second means for opening and closing the lower portion of the V-shaped housing which comprises a valve on each of the conical transitional members, whereby, when the apparatus is filtering a gas, gas entering through the inlet of the plenum chamber will flow in series, first through the predetermined number of one or more filter elements, thence into the enclosed zone, thence through the small apertures in the inward vertical walls of the housing, thence through the adsorbent particles contained in the housing, thence through the small apertures in the outward vertical walls of the housing, and thence out of the plenum chamber through the outlet thereof.

* * * * *